March 9, 1965 W. W. MOORE 3,172,475
ABRADING CASING CENTRALIZER
Filed Aug. 1, 1962

WESLEY W. MOORE
INVENTOR.

BY D. Carl Richards

ATTORNEY

United States Patent Office 3,172,475
Patented Mar. 9, 1965

3,172,475
ABRADING CASING CENTRALIZER
Wesley W. Moore, 4524 Manning Lane, Dallas, Tex.
Filed Aug. 1, 1962, Ser. No. 214,134
7 Claims. (Cl. 166—172)

This invention relates to a centralizer and more particularly to a reciprocating type of casing centralizer which will serve to abrade the adjacent wall surfaces to clean them of mud cake and the like.

Apparatus such as casing centralizers, wall scratchers, cement baskets, and the like are slidably mounted on casing strings or similar conduits to perform specified functions in a well bore. In placing such equipment in the well bore, the casing is lowered longitudinally through the well bore to the desired location. Various types of motion are imparted to the casing in order to perform the function desired by the attached equipment. In conventional operations, the casing is lowered into the drill hole. Thereafter a given amount of cement slurry is introduced into the casing and then is forced downward through the casing by hydraulic means so that the cement flows out around the bottom of the casing and upward through the annular space between the casing and the borehole walls. Operations are so controlled in the general case that the movement of the cement slurry is terminated at about the time the terminal portion of the cement body reaches the lower end of the casing. By this means an annular body of cement is deposited which is intended to provide a fluid-tight seal between the various formations and the casing and thus prevents migration of fluids through the annular space.

From a study of cementing operations completed in the past by various new analyzing techniques, it has been indicated that many cement jobs achieve less than desired bonding and sealing of the various formations. In zones where substantial permeability of the formations is encountered during drilling, an undesirable thick cake consisting primarily of drill cuttings is deposited onto the wall of the hole as the drilling fluid is lost to the porous formation. The mud cake may serve to seal the formation to prevent further contamination thereof by the drilling fluids. However, when such zone is cemented, following which producing operations are initiated, the release of formation pressure into the casing may be accompanied by erosion or depletion of the mud cake, thus causing a channel to appear in the zone previously occupied by the mud cake. Thus, it becomes of importance to clean the surface of many formations to which the cement layer is to be bonded.

Scratchers and various types of scrapers have been employed in the past for carrying out this cleaning operation. However, there remains the problem of introducing a cleaning device and of controlling its operation in the most effective manner.

In accordance with the present invention, there is provided a casing centralizer which will serve to abrade the walls in a selective manner. More particularly, there is provided upper and lower bands adapted to encircle a pipe. Spiral bow spring blades extend between and are secured to the upper and lower bands. The bands, together with the blades, are movable as a unit relative to the pipe. A third band is provided to encircle the pipe and is adapted to be secured thereto between the first and second bands. On one end of the third band there is provided structure having minimal restraining force on the unit when the pipe is moved in one direction. At the other end of the third band, structure is provided which cooperates with one of said upper or lower bands to introduce a high coefficient of the friction and thus restrain the unit for rotational movement relative to the pipe during movement of the pipe in the other direction.

In a preferred embodiment of the invention, the third band has one end which is smooth and permits rotation of the unit relative thereto when the pipe is moved in one direction carrying the unit with it. The other end of the third ring, together with the confronting end of one of the first and seconds bands, is serrated or toothed for engagement one with the other to prevent relative rotation between the pipe and the unit.

For a more complete understanding of the present invention and for further objects and advantages thereof, reference may now be had to the following description taken in conjunction with the accompanying drawings in which.

Figure 1:
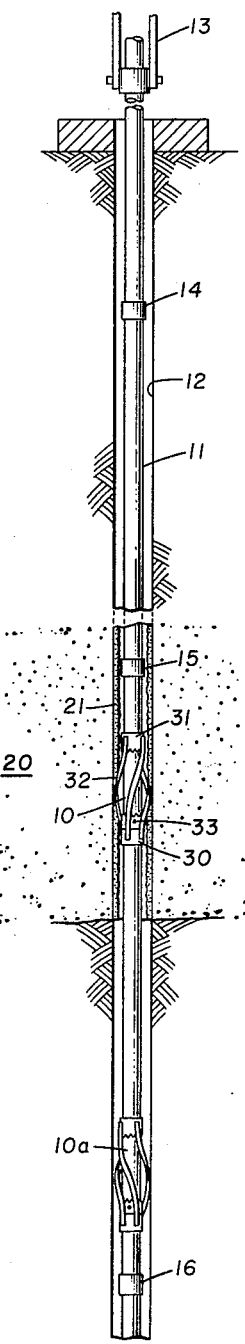
FIGURE 1 illustrates a well installation employing the present invention.

Referring now to FIGURE 1, there is illustrated an abrading type of a reciprocating casing centralizer 10 which is mounted on a casing 11 which is lowered into a borehole 12 as by suitable surface mechanism generically represented by the mechanism 13. The casing includes a plurality of joints of pipe coupled together by couplings 14, 15, and 16. The casing is lowered into the borehole through a permeable formation 20. During the course of drilling through the formation 20, a mud cake 21 may form on the walls of the borehole to a substantial thickness. The thickness is such that when the cement is placed behind the casing 11 there will remain a substantial mud cake between the outer surface of the cement layer and the formation 20. The present invention is designed to facilitate the removal of the mud cake through a selective operation of the casing 11.

More particularly, the centralizer 10 includes a lower band 30 and an upper band 31. A plurality of blades, such as the blade 32 are spiraled and couple the lower band 30 to the upper band 31. A third band 33 is secured in fixed relation to the wall of the casing 11. The lower end of the band 33 is smooth so that as the casing 11 is lowered into the borehole, the band 33 will engage the band 30 and push the centralizer 10 downward. As the blades 32 engage the mud cake 21, the casing centralizer will be permitted to rotate so that the blades will spiral themselves down through the mud cake. Little if any disturbance is thus wrought in the mud cake during the downward passage. However, the upper surface of the ring 33 is serrated in a manner as to match the lower surface of the upper ring 31. When this is the case, upward movement of the casing 11 causes the ring 33 to lock into engagement with the band 31, thereby preventing rotation of the centralizer 10 relative to the pipe. Thus, if the centralizer 10 is lowered and raised repeatedly through the formation 20 with the centralizer 10 serving as a scraper, it will cut the unwanted cake 21 from the formation and thus substantially clean the formation in a manner suitable for cementing operations.

More than one centralizer may be employed if desired. For example, there is illustrated a second centralizer 10a which is secured to the casing 11 somewhat below the centralizer 10.; Further, if may be desirable in portions of the borehole to install the scrapers upside down to reverse the scraping operation. In the latter case the band 33 would have a lower surface mating with a serrated upper surface of the lower band. In this case the scraper would be locked to the pipe during downward travel.

Significant features of the present invention are the provision of upper and lower bands which are interconnected by spiral blades which are flexible as the engage the material on the formation walls. A third band is provided which is adapted to be securely fixed to the walls of the casing in contrast to the freely movable first and seconds bands. One end of the third band is provided with structure which mates and locks with the confronting surface of one of the first and second bands. By this means, the centralizer may rotate relative to the casing when moving in one direction, but is locked as to prevent rotation when moved in the other direction.

Figure 2:
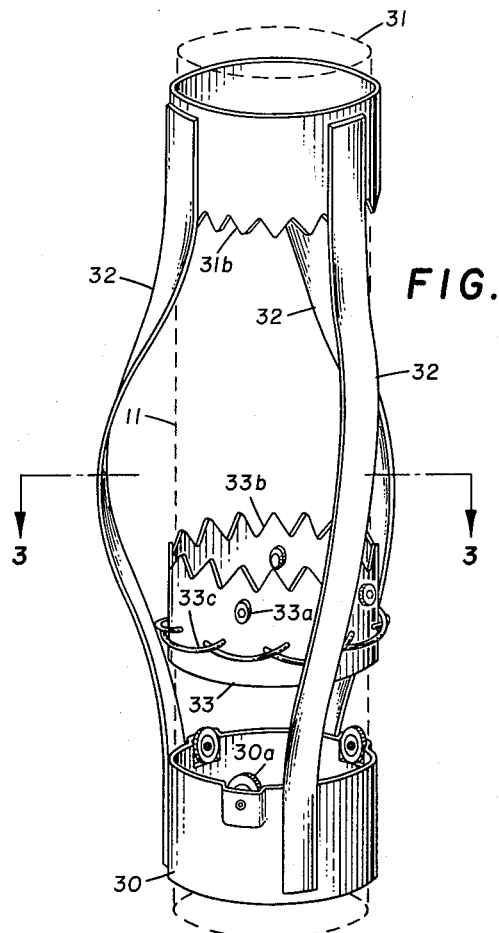
FIGURE 2 is an enlarged view of one embodiment of the invention.

In the more detailed and enlarged view shown in FIGURE 2, a casing which may be of the order of 7" O.D. supports a centralizer of the order of 30" in length. The upper band 31 and the lower band 30 are interconnected by the spiral blades 32. In a preferred embodiment at least three spiral blades will be employed. They will course around the structure at a helix angle of the order of 7½°. The range of the helix angle may vary from a preferred arrangement. The bands 30 and 31 would each be of the order of 4" in length and of material of the order of 3/16" thick. Between the bands 30 and 31 is the anchor band 33. The band 33 is adapted to slide over a casing to permit it to be freely positioned at any point along the casing. The band 33 is secured to the casing as by welding, or by a plurality of set screws 33a, or other suitable means. As shown in FIGURE 1, the upper surface 33b of the ring or band 33 has substantial end contour, shown in the form of a serrated or toothed profile, to match the corresponding serrated or toothed contour 31b of the lower end of the upper band 31. It will be preferred that the blades be provided in a number which is not a factor of the number of teeth. This will reduce the probability of the blades retracing the first path on successive strokes.

In the embodiment shown in FIGURE 2 the lower surface of the anchor band 33 is smooth as is the upper surface of the lower band 30. In addition in this embodiment, a plurality of rollers, such as roller 30a, are mounted adjacent to the upper end of the lower band 30. They serve to contact the anchor band 33 and minimize the heavy frictional forces generated between the band 33 and the band 30. Thus, as the pipe carrying band 33 is lowered downwardly, the centralizer may freely rotate as the blades 32 engage the walls. However, when the direction of movement of the pipe is reversed, that is, moved in an upward direction, the teeth 33b engage the teeth 31b, thereby preventing rotation of the centralizer.

It will be noted that a plurality of resilient wire loops 33c extend outwardly from the anchor band 33 and serve to clean the spiral blades 32 upon relative movement therebetween.

Figure 3:
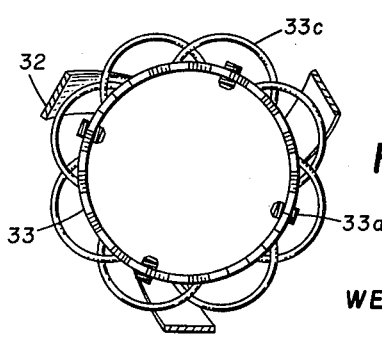
FIGURE 3 is a sectional view taken along line 3—3 of FIGURE 2.

The structure thus far described is also seen in FIGURE 3 wherein the relative orientation of the blades 32, the band 33, the set screws 33a and the resilient loops 33c are included in section.

When a plurality of centralizers are used to clean a given formation, it will be found desirable to place the units on the pipes such that the spiral blades of adjacent centralizers are oriented opposite in sense. Twisting forces thus produced on the casing by reason of working of the walls of the spiral blades will be minimized. As shown in FIGURE 1, the upper centralizer 10 has the blades 32 spiraled in a direction opposite to the blades of the lower centralizer 10a.

Where casing or pipe having external upset ends is employed, the bands 30, 31, and 33 will be hinged as well-known in the art so that they can be applied to such pipe. However, where non-upset ends are employed, the hinge features need not be included since the centralizer and the locking ring can be slipped over the end of the pipe as this is made up at the surface.

Having described the invention in connection with certain specific embodiments thereof, it is to be understood that further modifications may now suggest themselves to those skilled in the art and it is intended to cover such modifications as fall within the scope of the appended claims.

What is claimed is:
1. An abrading casing centralizer which comprises:
 (a) two rings adapted slidably and rotatably to encircle a casing,
 (b) an array of outwardly bowed spiral blades secured to said rings to maintain them in spaced-apart relation,
 (c) an anchor ring adapted to encompass and to be secured to said casing between said two rings,
 (d) said anchor ring having one serrated end, and
 (e) one of said two rings having a serrated end confronting and matching the serrations on said anchor ring for resisting rotation of said two rings when said anchor ring is moved in the direction of said serrated end.
2. An abrading casing centralizer which comprises:
 (a) two rings adapted slidably and rotatably to encircle a casing,
 (b) an array of spiral blades secured to said rings to maintain them in spaced-apart relation,
 (c) an anchor ring adapted to encircle and to be secured to said casing between said rings,
 (d) said anchor ring having a substantial end contour to form rotational engaging means on one end, and
 (e) one of said two rings having a substantial end contour to form rotational engaging means confronting said one end of said anchor ring and mating therewith to effect substantial resistance to rotation between said two rings when said anchor ring is moved in the direction of said one end.
3. An abrading casing centralizer which comprises:
 (a) two rings to slidably and rotatably encircle said casing with clearance therebetween,
 (b) an array of spiral blades secured to said rings to maintain them in spaced-apart relation,
 (c) an anchor ring adapted to encircle and to be secured to said casing between said rings,
 (d) said anchor ring having teeth on one end, and
 (e) one of said two rings having mating teeth on one end thereof confronting said teeth on said anchor ring for resisting rotation of said two rings when said anchor ring is moved in the direction of said one end.
4. The combination set forth in claim 3 in which said blades follow a spiral between said two rings at a helix angle of about 7½°.
5. The combination set forth in claim 3 in which the faces of said teeth subtend angles of the order of 90°.
6. The combination set forth in claim 3 in which the number of said blades is not a factor of the number of said teeth.
7. The combination set forth in claim 3 in which three blades are provided of length of the order of five times the diameter of said rings.

References Cited by the Examiner
UNITED STATES PATENTS

| | | | |
|---|---|---|---|
| 2,220,237 | 11/40 | Hall | 166—172 |
| 2,295,058 | 9/42 | Smethers | 166—175 |
| 2,312,600 | 3/43 | Steps | 166—172 |
| 2,323,027 | 6/43 | Gerstenkorn | 175—325 X |
| 2,515,149 | 7/50 | Willhoit | 166—173 X |

BENJAMIN HERSH, Primary Examiner.
CHARLES E. O'CONNELL, Examiner.